Nov. 19, 1968  H. NEHL  3,411,325
ELASTIC COUPLING
Filed March 15, 1967
FIG.1
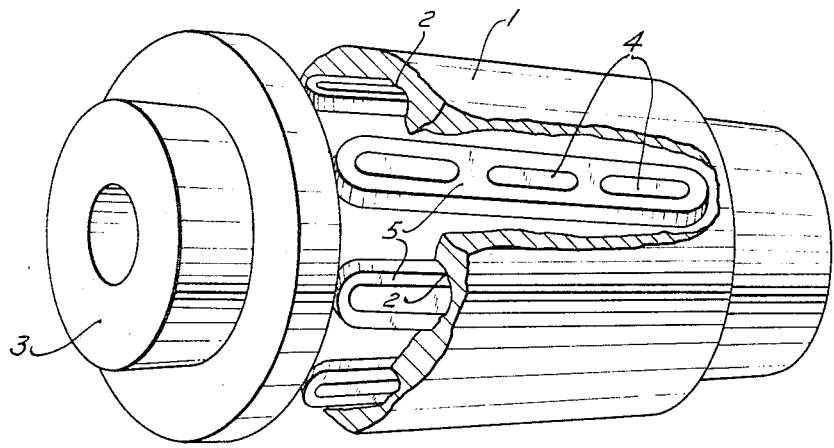
FIG.2
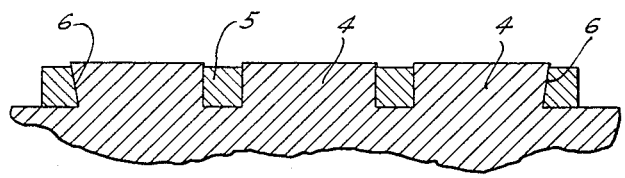
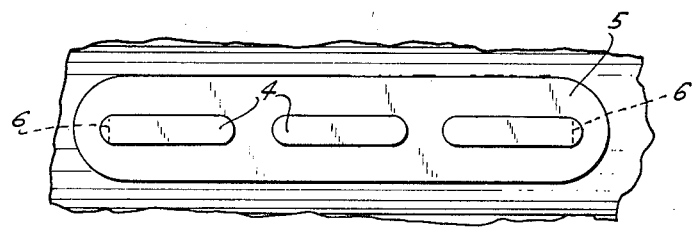
FIG.3
INVENTOR
Heinrich Nehl
BY Michael S. Striker
ATTORNEYS

United States Patent Office 3,411,325
Patented Nov. 19, 1968

3,411,325
ELASTIC COUPLING
Heinrich Nehl, Peine, Hannover, Germany, assignor to
Kerkhoff & Co., Wolfenbuttel, Germany
Filed Mar. 15, 1967, Ser. No. 624,660
Claims priority, application Germany, Sept. 14, 1966,
K 55,525
4 Claims. (Cl. 64—27)

ABSTRACT OF THE DISCLOSURE

An elastic coupling mainly comprising a first tubular coupling member provided at the inner surface thereof with a plurality of axially extending grooves, a second substantially cylindrical coupling member extending into the first tubular coupling member and provided at the outer surface thereof with a plurality of rows of teeth in which the teeth in each row are axially aligned with and spaced in axial direction from each other and in which the rows of teeth are respectively arranged with ample lateral clearance in the aforementioned grooves, and an integral jacket of elastic material surrounding each row of teeth and substantially filling the aforementioned lateral clearance and the spaces between adjacent teeth in each row.

Background of the invention

Elastic couplings are known in which the inner coupling member is provided with axially extending teeth cooperating with grooves formed in the outer coupling member in which each of the teeth is surrounded by an endless jacket of elastic material so as to provide a flexible coupling between the two coupling members.

It is also known, especially if the coupling is relatively long, to provide on the inner coupling member, instead of a plurality of teeth extending in axial direction throughout the whole length of the coupling member, a plurality of rows of teeth in which the teeth in each row are axially aligned with and spaced from each other and in which each tooth of the row is surrounded by its flexible jacket.

Elastic couplings of the aforementioned kind are especially used to couple two shaft ends of a heavy drive, as for instance used in rolling mills, and while the couplings of the aforementioned type known in the art have in general worked out satisfactorily, these couplings known in the art have the disadvantage that when one of the elastic packets is damaged or torn, this torn jacket led, especially during engagement or disengagement of the coupling elements, to difficulties and sometimes even also to a damaging of adjacent jackets.

In addition, the separate jackets for each tooth had the disadvantage that the placing of the jackets in tight engagement with respective teeth was a rather difficult and time-consuming task.

It is an object of the present invention to overcome the above-mentioned disadvantages of elastic couplings of the aforementioned type.

It is an additional object of the present invention to provide for an elastic coupling of the aforementioned kind in which the jackets, even when torn at one place, should still remain properly fastened to the teeth.

It is a further object of the present invention to provide an elastic coupling of the aforementioned kind in which mounting of the jackets on the teeth is facilitated.

Summary of the invention

With these objects in view, the elastic coupling according to the present invention mainly comprises a first tubular coupling member provided at the inner surface thereof with a plurality of axially extending grooves, a second substantially cylindrical coupling member extending into the first tubular coupling member and provided at the outer surface thereof with a plurality of rows of teeth in which the teeth in each row are axially aligned with and spaced in axial direction from each other and the rows of teeth are respectively arranged with ample clearance in the grooves, and an integral jacket of elastic material surrounding each row of teeth and substantially filling the aforementioned lateral clearance and the spaces between adjacent teeth in each row.

Preferably, the end face of each tooth at the end of each row of teeth which faces away from the tooth adjacent thereto is undercut and each jacket has corresponding faces engaging the undercut faces of the teeth at the end of the respective row.

Evidently, if such a jacket is, due to a sudden overload acting on the coupling, torn at any place, the jacket which integrally surrounds the teeth of each row will still be properly held on the teeth, so that the torn jacket will not prevent displacement of the two coupling members in axial direction.

In addition, since for each row of teeth only a single jacket is provided, the mounting of the jacket on the teeth will be greatly facilitated.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

Brief description of the drawing

FIG. 1 is a perspective view of the elastic coupling according to the present invention with portions of the tubular coupling member broken off to show the construction of the second coupling member and the teeth with the jackets therein more clearly;

FIG. 2 is a partial axial cross-section through the teeth of the second coupling member and the jacket surrounding the teeth; and FIG. 3 is a top view of FIG. 2.

Description of the preferred embodiments

Referring now to the drawings, it will be seen that the elastic coupling according to the present invention mainly comprises a first tubular coupling member 1 provided at the inner surface thereof with a plurality of axially extending grooves 2 which are circumferentially spaced from each other, a second substantially cylindrical coupling member 3 extending with a portion thereof into the first tubular coupling member 1 and provided at the outer surface thereof with a plurality of rows of teeth 4 in which the teeth of each row extend in axial direction and are aligned with and spaced in axial direction from each other. As shown in FIG. 1, the rows of teeth 4 are respectively arranged with ample clearance in the grooves 2 of the first coupling member 1.

The elastic coupling further comprises an integral jacket 5 of elastic material, for instance rubber, surrounding each row of teeth and substantially filling the aforementioned lateral clearance between side faces of the teeth 4 and corresponding side faces of the grooves 2 and the spaces between adjacent teeth in each row. The teeth 4 have a substantially rectangular cross-section and the end face 6 of each tooth at the end of each row of teeth which faces away from the tooth adjacent thereto is undercut, that is, the end face 6 is an inwardly inclined plane face, and the surrounding jacket has corresponding faces engaging the undercut faces 6 of the teeth at the ends of each row to assure thereby that the jacket 5 is properly held on each row of teeth.

It will be understood that each of the elements described above, or two or more together, may also find a useful application in other types of elastic couplings differing from the types described above.

While the invention has been illustrated and described as embodied in an elastic coupling in which the inner coupling member is provided with a plurality or rows of teeth and integral jackets of elastic material surrounding each row of teeth, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What I claim as new and desired to be protected by Letters Patent is:

1. An elastic coupling comprising, in combination, a first tubular coupling member provided at the inner surface thereof with a plurality of axially extending grooves; a second substantially cylindrical coupling member extending into said first tubular coupling member and provided at the outer surface thereof with a plurality of rows of teeth, the teeth in each row being axially aligned with and spaced in axial direction from each other and the rows of teeth being respectively arranged with ample lateral clearance in said grooves; and an integral jacket of elastic material surrounding each row of teeth and substantially filling said lateral clearance and the spaces between adjacent teeth in each row.

2. An elastic coupling as defined in claim 1, wherein said teeth have each a substantially rectangular cross-section.

3. An elastic coupling as defined in claim 2, wherein the end face of each tooth at the end of each row of teeth which faces away from the tooth adjacent thereto is undercut and each jacket has corresponding faces engaging the undercut faces of the teeth at the ends of the respective row.

4. An elastic coupling as defined in claim 3, wherein each of said undercut faces is an inwardly inclined plane face.

References Cited
UNITED STATES PATENTS

| | | | |
|---|---|---|---|
| 2,394,448 | 2/1946 | Herold et al. | 64—14 |
| 2,544,194 | 3/1951 | Vanderzee | 64—9 |
| 3,045,763 | 7/1962 | Perrott | 64—27 X |
| 3,321,935 | 5/1967 | Wildhaber | 64—9 |

FOREIGN PATENTS 1,081,306  6/1954  France.

HALL C. COE, *Primary Examiner.*